(12) United States Patent
Yamashita et al.

(10) Patent No.: US 10,532,708 B2
(45) Date of Patent: Jan. 14, 2020

(54) CIRCUIT BODY ROUTING STRUCTURE AND VEHICLE CIRCUIT BODY

(71) Applicants: YAZAKI CORPORATION, Tokyo (JP); TOYOTA JIDOSHA KABUSHIKI KAISHA, Aichi-ken (JP)

(72) Inventors: Toshiaki Yamashita, Shizuoka (JP); Noriaki Sasaki, Shizuoka (JP); Shinji Oshita, Aichi-ken (JP); Hiroki Kawakami, Aichi-ken (JP)

(73) Assignees: YAZAKI CORPORATION, Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/183,643

(22) Filed: Nov. 7, 2018

(65) Prior Publication Data

US 2019/0176723 A1   Jun. 13, 2019

(30) Foreign Application Priority Data

Dec. 11, 2017 (JP) ................. 2017-237017

(51) Int. Cl.
| | |
|---|---|
| *B60R 16/02* | (2006.01) |
| *B62D 21/02* | (2006.01) |
| *B62D 25/04* | (2006.01) |
| *H02G 3/04* | (2006.01) |

(52) U.S. Cl.
CPC .......... *B60R 16/0215* (2013.01); *B62D 21/02* (2013.01); *B62D 25/04* (2013.01); *H02G 3/0487* (2013.01)

(58) Field of Classification Search
CPC .... B60R 16/0215; B62D 25/04; B62D 21/02; H02G 3/0487
USPC ....................................... 174/70 C
See application file for complete search history.

(56) References Cited

U.S. PATENT DOCUMENTS 4,236,729 A * 12/1980 Suzuki .................... B60R 22/06
280/804

FOREIGN PATENT DOCUMENTS

| | | |
|---|---|---|
| JP | 1-126854 U | 8/1989 |
| JP | 2016-165166 A | 9/2016 |

* cited by examiner

*Primary Examiner* — Sherman Ng
(74) *Attorney, Agent, or Firm* — Kenealy Vaidya LLP

(57) ABSTRACT

A circuit body routing structure includes a circuit body routed, with respect to a vehicle body having a rocker on which a center pillar is erected, along the rocker. The circuit body is formed of a long flat conductor having a conductor portion of a flat cross-sectional shape. The circuit body includes a linear portion disposed overlapping an upper surface of the rocker, and a detour portion disposed overlapping a side surface of the rocker on a vehicle interior side or a side surface of the center pillar on the vehicle interior side at a junction between the rocker and the center pillar.

4 Claims, 10 Drawing Sheets

CIRCUIT BODY ROUTING STRUCTURE AND VEHICLE CIRCUIT BODY

This application is based on and claims priority under 35 USC 119 from Japanese Patent Application No. 2017-237017 filed on Dec. 11, 2017, the contents of which are incorporated herein by reference.

TECHNICAL FIELD

The present invention relates to a circuit body routing structure and a vehicle circuit body.

BACKGROUND ART

In a vehicle such as an automobile, a wire harness may be routed in a front-rear direction along a lateral portion of a vehicle body. As a technique for routing a wire harness along a lateral portion of a vehicle body, there is known a technique in which, on a side portion of a vehicle body, a wire harness including an electric wire to which a protection member is attached is disposed on an inner corner portion formed on an upper portion of a rocker (a side sill) including a side panel raised up from a floor and a panel extending horizontally from an upper edge of the side panel (for example, see Patent Document 1).

There is also known a technique in which a wire harness fixed to a protector is housed in a groove formed on a side surface of a rocker, and the protector is fastened and fixed to a stud bolt provided on the rocker (for example, see Patent Document 2).

PRIOR ART DOCUMENT

Patent Document

Patent Document 1: JP-A-2016-165166
Patent Document 2: JP-U-H1-126854

SUMMARY OF INVENTION

However, when the wire harness bundling the electric wire is routed along the upper portion of the rocker as described in Patent Document 1, a height of the entire rocker is increased, and excellent boarding/alighting performance thereof is impaired. In addition, since a pillar partitioning a door opening on the front and the rear of the vehicle is joined to the upper portion of the rocker, the wire harness needs to be routed around the pillar, and the wire harness protrudes toward the floor side in the pillar portion. Further, the portion of the wire harness protruding toward the floor side needs to be protected by mounting the protector, resulting in an increase in weight and cost of the wire harness.

Further, in the routing structure as described in Patent Document 2, although upward bulkiness of the rocker is suppressed, fixing work for fixing the protector to a predetermined position of the wire harness with a tape or the like and fastening work for fitting the wire harness to the groove of the rocker so as to fasten the protector to the stud bolt provided on the rocker are required, and thus it takes time and effort to perform routing on the vehicle body. Further, since a fastening structure such as a stud bolt and a nut for fastening the protector is required, the cost is increased.

The present invention has been made in view of the circumstances described above, and it is an object of the present invention to provide a circuit body routing structure and a vehicle circuit body which can easily be routed along a rocker while ensuring excellent boarding/alighting performance, and which can lower the cost.

In order to achieve the above-described object, the circuit body routing structure according to the present invention is characterized by the following (1) to (3).

(1) A circuit body routing structure including a circuit body routed, with respect to a vehicle body having a rocker on which a pillar is erected, along the rocker, wherein:
 the circuit body is formed of a long flat conductor having a conductor portion of a flat cross-sectional shape, and includes:
 a linear portion disposed overlapping an upper surface of the rocker, and
 a detour portion disposed overlapping a surface on a vehicle interior side of the rocker or the pillar at a junction between the rocker and the pillar.

(2) The circuit body routing structure according to (1), wherein:
 the detour portion includes:
 a first planar bent portion that is continuous with the linear portion and that is bent toward a vehicle interior direction from an extending direction of the rocker in a plane within the upper surface of the rocker,
 a folded portion that is continuous with the first planar bent portion and that is folded from the upper surface of the rocker to an extending direction of the pillar along a side surface of the rocker,
 a second planar bent portion that is continuous with the folded portion and that is bent from the extending direction of the pillar to the extending direction of the rocker in a plane within the side surface of the rocker, and
 a coupling portion that is continuous with the second planar bent portion and that extends in the extending direction of the rocker.

(3) The circuit body routing structure according to (1), wherein:
 the detour portion includes:
 a direction changing portion that is continuous with the linear portion and that is twisted in a direction from the linear portion side along the side surface of the pillar with reference to an edge portion on the vehicle interior side, and
 a coupling portion that is continuous with the direction changing portion and that is routed in the extending direction of the rocker overlapping the side surface on the vehicle interior side of the pillar.

According to the circuit body routing structure of the configuration (1), the circuit body is a flat conductor, and the linear portion is disposed overlapping the upper surface of the rocker. As a result, it is possible to suppress the upward bulkiness of the rocker and to reduce the height even in a state in which the rocker is covered with an interior material, and it is possible to ensure excellent boarding/alighting performance. Further, at the junction between the rocker and the pillar, the detour portion is disposed overlapping the surface on the vehicle interior side of the rocker or pillar. Therefore, it is possible to reduce the occupation of in-vehicle space by reducing protrusion of the circuit body toward the vehicle interior side. Moreover, a protector and a fastening structure for fastening the protector can be eliminated, and the weight and the cost can be reduced.

According to the circuit body routing structure of the configuration (2), routing can be performed while minimizing protrusion toward the vehicle interior side and detouring around the pillar without difficulty.

According to the circuit body routing structure of the configuration (3), routing can be performed while minimizing protrusion toward the vehicle interior side and detouring around the pillar without difficulty.

The vehicle circuit body of the present invention is characterized by the following (4).

(4) A vehicle circuit body routed, with respect to a vehicle body having a rocker on which a pillar is erected, along the rocker, wherein:

the circuit body is formed of a long flat conductor having a conductor portion of a flat cross-sectional shape, and includes:

a linear portion disposed overlapping an upper surface of the rocker, and a detour portion disposed overlapping a surface on a vehicle interior side of the rocker or the pillar at a junction between the rocker and the pillar.

According to the vehicle circuit body having the configuration (4), the vehicle circuit body is a flat conductor, the linear portion is disposed overlapping the upper surface of the rocker, and the detour portion is disposed on the surface on the vehicle interior side of the rocker or the pillar at the junction between the rocker and the pillar. As a result, it is possible to suppress upward bulkiness of the rocker, and to suppress protrusion to the vehicle interior side.

EFFECT OF THE INVENTION

According to the present invention, it is possible to provide a circuit body routing structure and a vehicle circuit body which can easily be routed along a rocker while ensuring excellent boarding/alighting performance, and which can lower the cost.

The present invention has been briefly described above. Further, the details of the present invention will be further clarified by reading embodiments for applying the invention as described below (hereinafter referred to as "embodiments") with reference to the accompanying drawings.

BRIEF DESCRIPTION OF DRAWINGS

FIG. 4A is a perspective view showing a first planar bent portion and a second planar bent portion, and FIG. 4B is a perspective view showing a folded portion.

DESCRIPTION OF EMBODIMENTS

Embodiments of the present invention will be described below with reference to the drawings.

(First Embodiment)

First, a circuit body routing structure and a vehicle circuit body according to a first embodiment will be explained.

Figure 1:
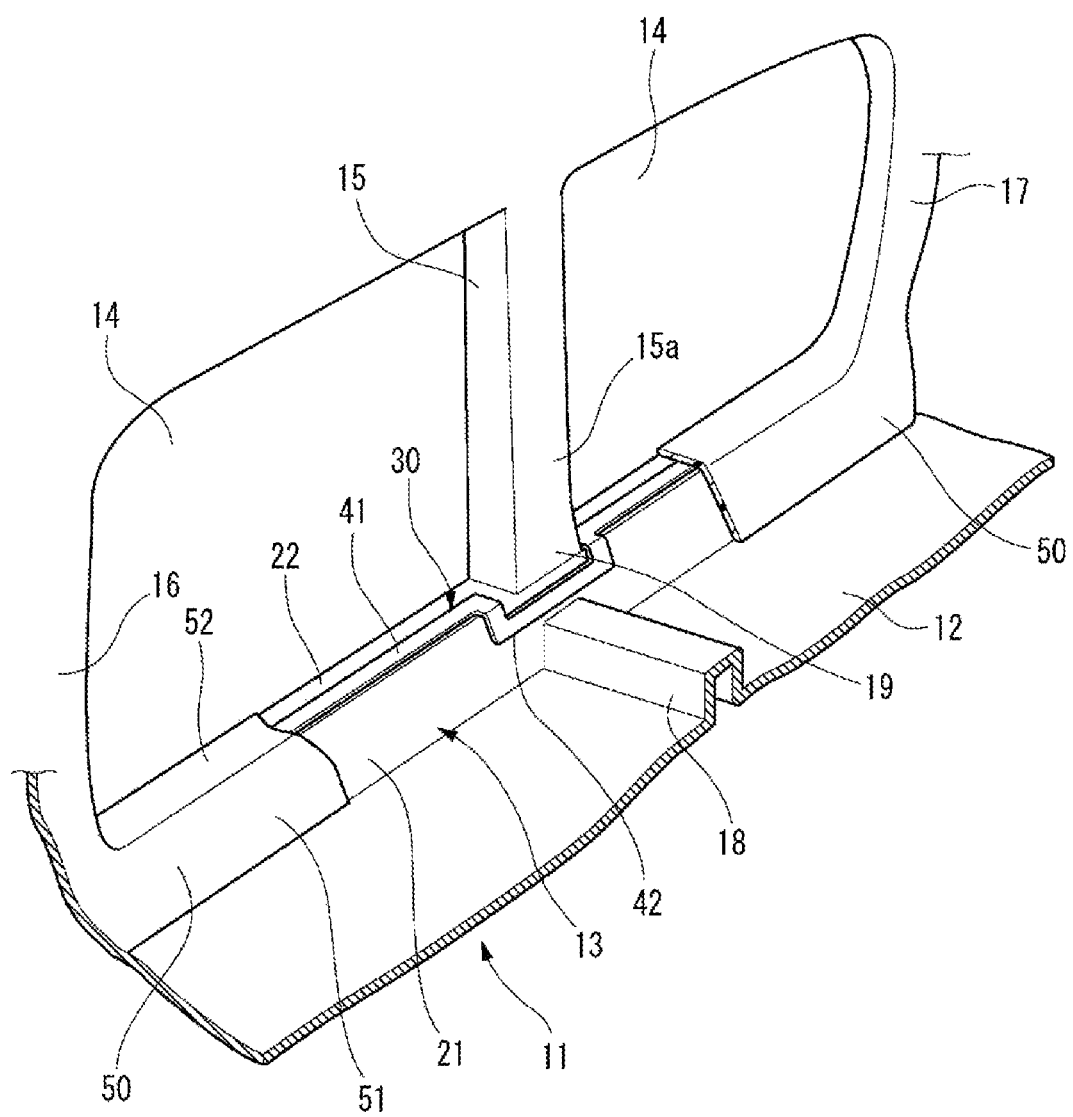
FIG. 1 is a perspective view of a vehicle body illustrating a circuit body routing structure and a vehicle circuit body according to a first embodiment.

FIG. 1 is a perspective view of a vehicle body illustrating the circuit body routing structure and the vehicle circuit body according to the first embodiment.

As shown in FIG. 1, the vehicle body 11 includes a rocker (side sill) 13 on a side portion of a floor panel 12. The rocker 13 extends in a vehicle front-rear direction and constitutes a lower edge of door openings 14 on the front and the rear of the vehicle. The rocker 13 projects upward from the floor panel 12. The rocker 13 has a side surface 21 and an upper surface 22.

A center pillar 15 partitioning the door openings 14 on the front and the rear of the vehicle is erected on the vehicle body 11 at an intermediate position in the vehicle front-rear direction. A lower end of the center pillar 15 is joined to the rocker 13. Lower ends of a front pillar 16 and a rear pillar 17 are joined to a front end and a rear end of the rocker 13, respectively. A cross member 18 extending in a vehicle width direction is formed in the floor panel 12, and an end portion of the cross member 18 is joined to the rocker 13.

A vehicle circuit body (hereinafter, simply referred to as a circuit body) 30 is routed along the rocker 13 on the vehicle body 11. An interior material 50 is attached to the rocker 13 on which the circuit body 30 is routed. The interior material 50 is molded from a resin such as plastic, and has a side plate portion 51 and an upper plate portion 52. The side surface 21 and the upper surface 22 of the rocker 13 on which the circuit body 30 is routed are covered by the side plate portion 51 and the upper plate portion 52 of the interior member 50. The interior material 50 is also attached to a junction 19 between the rocker 13 and the center pillar 15.

Figure 2:
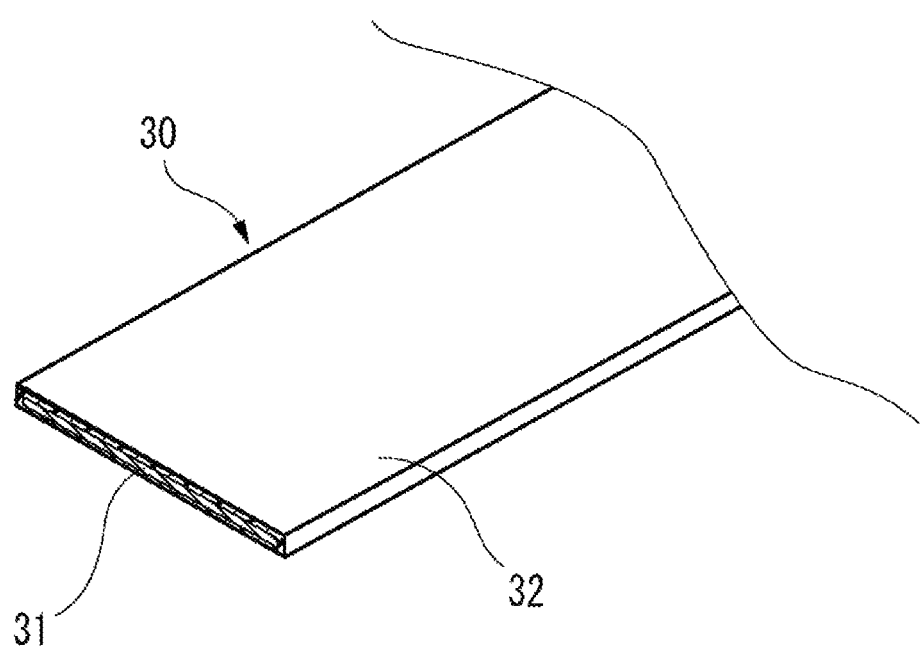
FIG. 2 is a perspective view of a vehicle circuit body formed of a flat conductor.

FIG. 2 is a perspective view of a vehicle circuit body formed of a flat conductor.

As shown in FIG. 2, the circuit body 30 is a long flat conductor having a conductor portion 31 formed in a flat cross-sectional shape. The conductor portion 31 is made of aluminum or an aluminum alloy, and the circuit body 30 is formed by covering the surrounding of the conductor portion 31 with an insulating layer 32 made of resin. The circuit body 30 is used as, for example, a power line (12V line). According to the circuit body 30 having the conductor portion 31 made of aluminum or an aluminum alloy, weight reduction can be achieved. The circuit body 30 may include a conductor portion 31 made of copper or a copper alloy.

Figure 3:
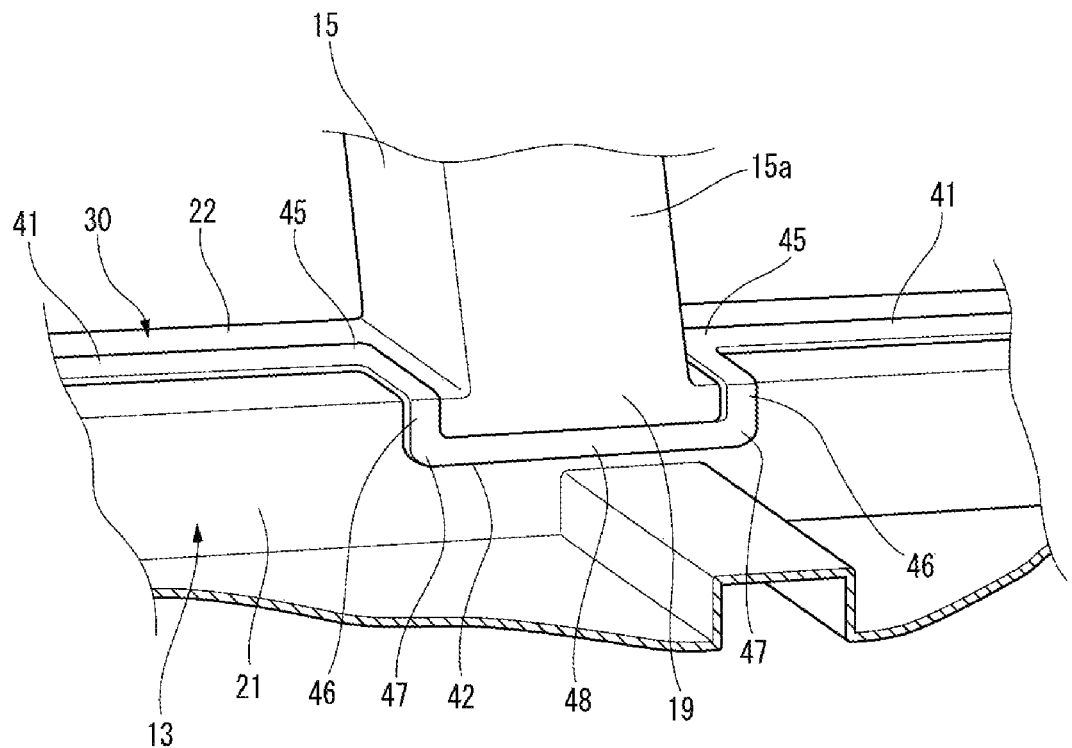
FIG. 3 is a perspective view of a rocker on which the vehicle circuit body is routed.
Figure 4A:
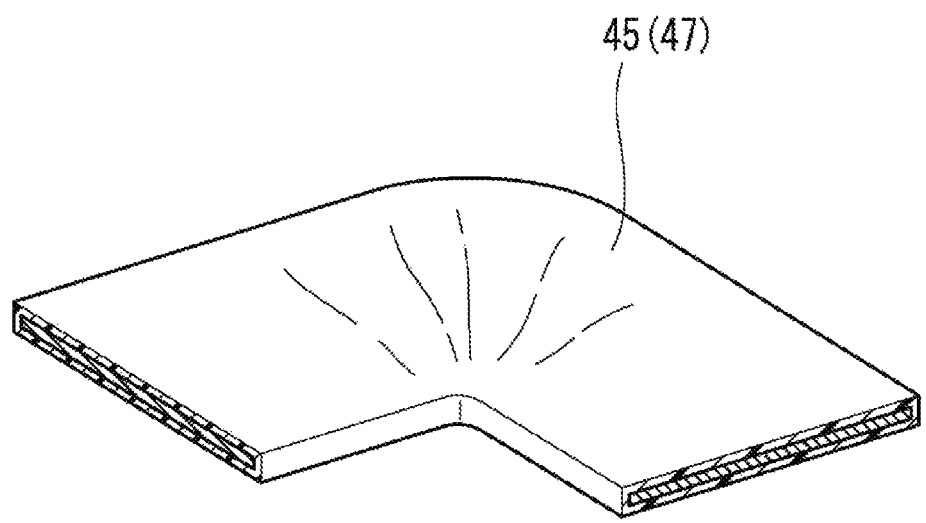
FIGS. 4A and 4B are perspective views showing the vehicle circuit body.
Figure 4B:
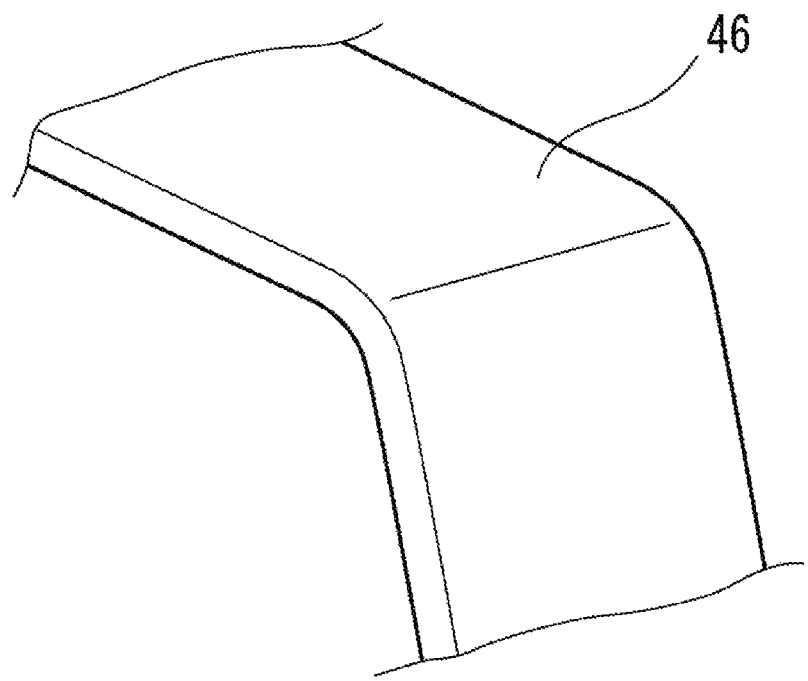
Figure 5:
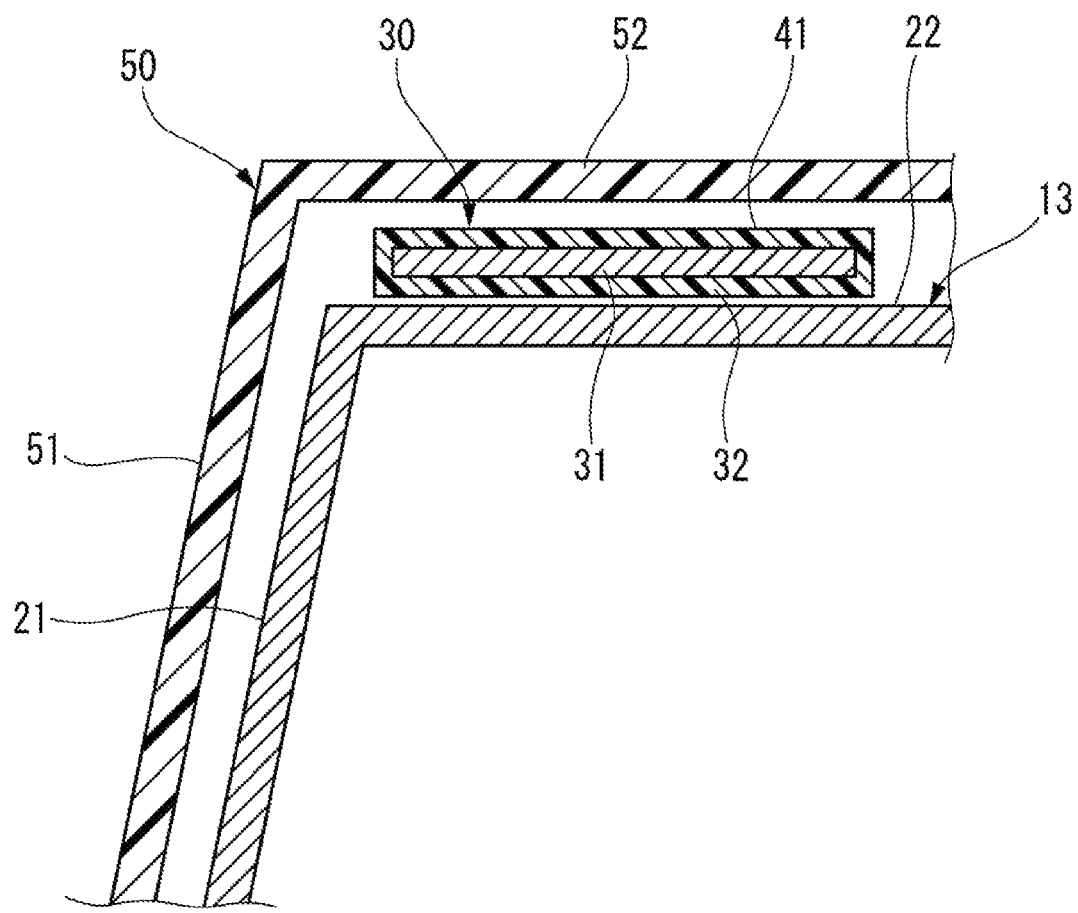
FIG. 5 is a cross-sectional view of the rocker on which the vehicle circuit body is routed.

FIG. 3 is a perspective view of the rocker on which the vehicle circuit body is routed. FIG. 4 are perspective views showing the vehicle circuit body, where FIG. 4A is a perspective view showing a first planar bent portion and a second planar bent portion, and FIG. 4B is a perspective view showing a folded portion. FIG. 5 is a cross-sectional view of the rocker on which the vehicle circuit body is routed.

As shown in FIG. 3, the circuit body 30 includes a linear portion 41 and a detour portion 42. The linear portion 41 is formed in a linear shape and is disposed overlapping the upper surface 22 of the rocker 13. The detour portion 42 is disposed overlapping the side surface 21 of the rocker 13 below the junction 19 between the rocker 13 and the center pillar 15.

The detour portion 42 includes a first planar bent portion 45, a folded portion 46, a second planar bent portion 47, and a coupling portion 48.

As shown in FIG. 4A, the first planar bent portion 45 and the second planar bent portion 47 are bent in a plane to change the extending direction. As shown in FIG. 4B, the extending direction of the folded portion 46 is changed by being folded in a direction intersecting the plane. Specifically, the first planar bent portion 45 is continuous with the linear portion 41 and is bent in a plane within the upper surface 22 of the rocker 13 by about 90° from the extending direction of the rocker 13 toward the vehicle interior direction. The folded portion 46 is continuous with the first planar bent portion 45 and is folded from the upper surface 22 of the rocker 13 to the extending direction of the center pillar 15 along the side surface 21 of the rocker 13. The second planar bent portion 47 is continuous with the folded portion 46 and is bent in a plane within the side surface 21 of the rocker 13 from the extending direction of the center pillar 15 to the extending direction of the rocker 13. The coupling portion 48 is linearly formed, and both ends thereof are continuous with the second planar bent portion 47 and extend in the extending direction of the rocker 13.

The circuit body 30 having the linear portion 41 and the detour portion 42 is obtained by extruding the long conductor portion 31, covering the same with the insulating layer 32, and then forming the detour portion 42 via bending. The circuit body 30 may be covered with the insulating layer 32 after the detour portion 42 is formed on the conductor portion 31 via bending.

As shown in FIG. 5, by routing the circuit body 30 on the rocker 13, the linear portion 41 of the circuit body 30 made of a flat conductor overlaps the upper surface 22 of the rocker 13, and the upper portion thereof is covered with the upper plate portion 52 of the interior member 50 assembled to the rocker 13.

Figure 6:
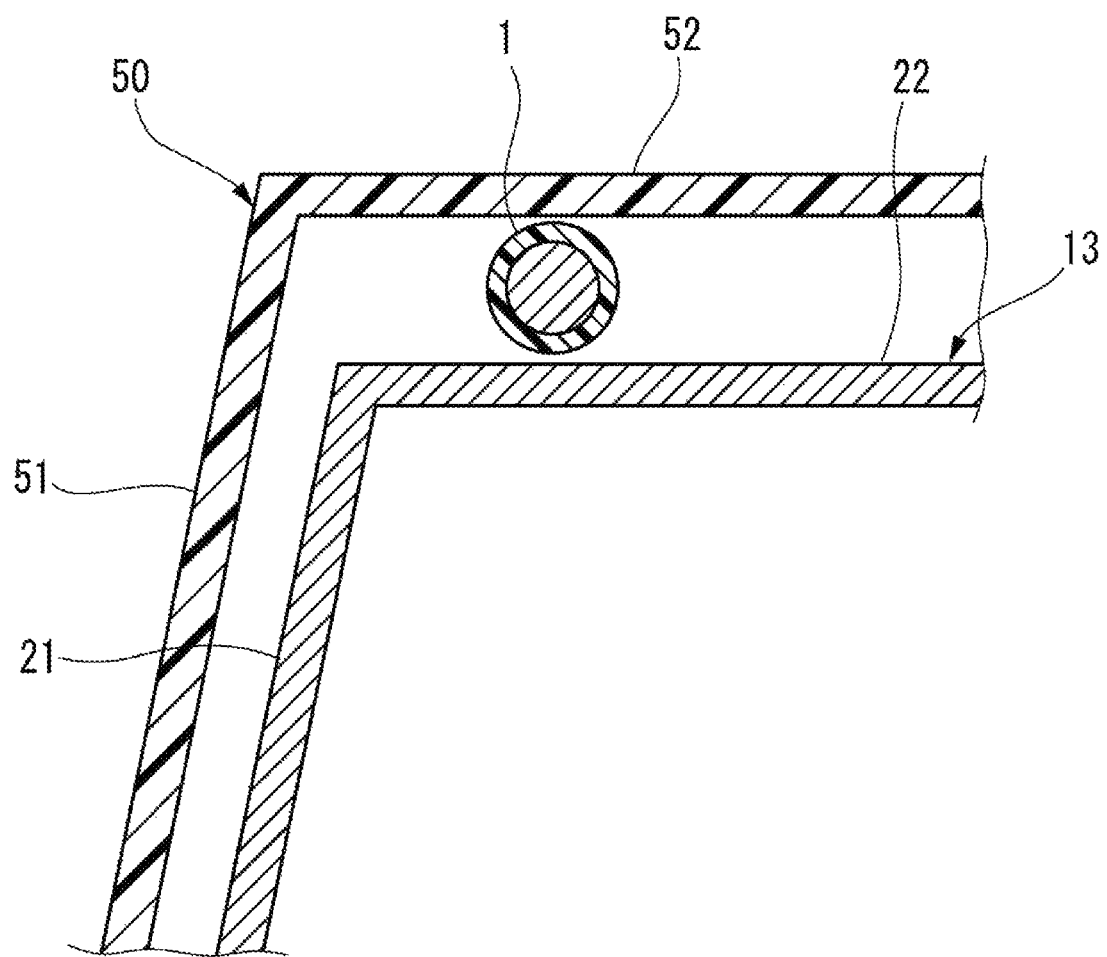
FIG. 6 is a cross-sectional view of the rocker on which a wire harness such as a wire bundle or a round bar conductor is routed.
Figure 7:
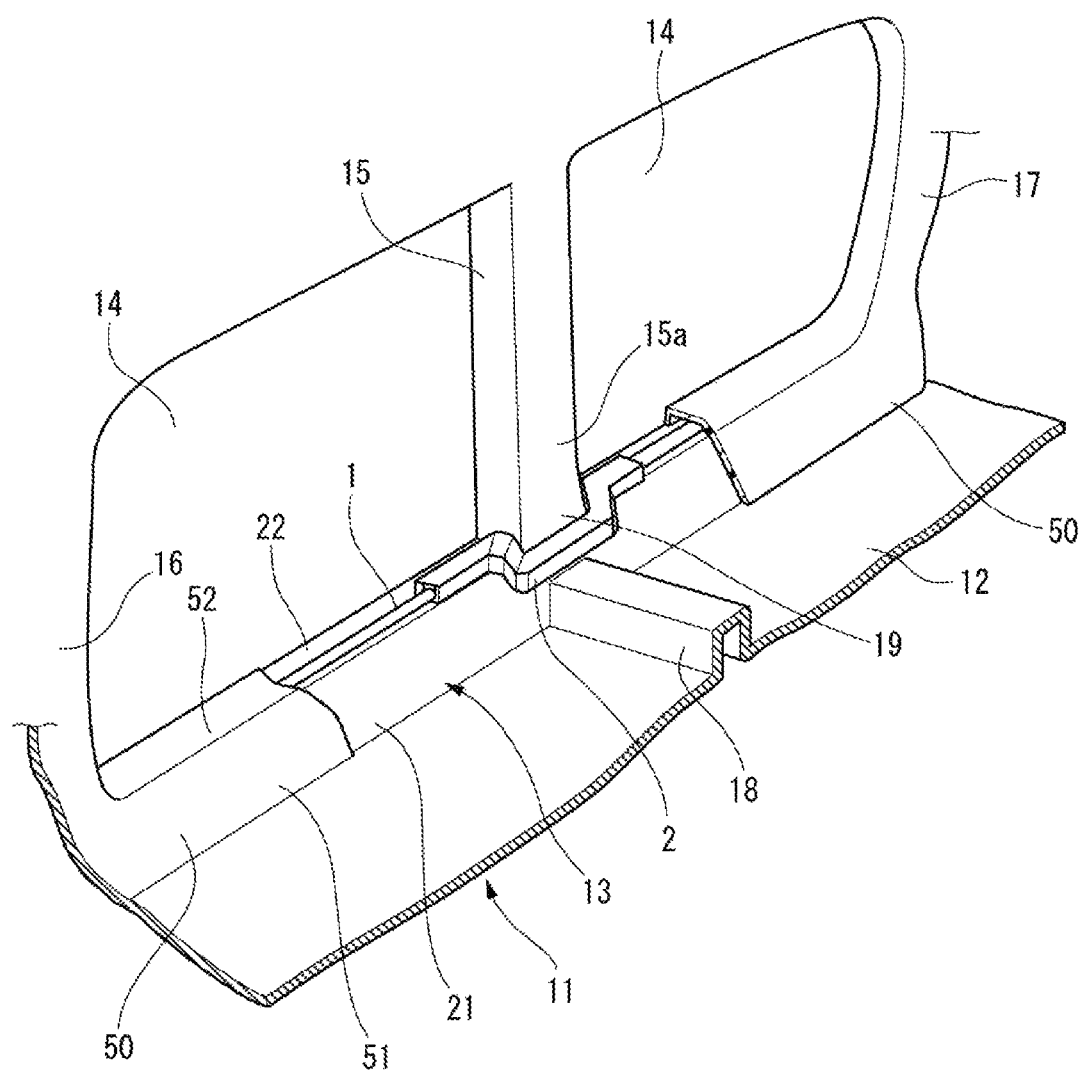
FIG. 7 is a perspective view of a vehicle body in which a wire harness such as a wire bundle or a round bar conductor is routed on a rocker.

FIG. 6 is a cross-sectional view of a rocker on which a wire harness such as a wire bundle or a round bar conductor is routed. FIG. 7 is a perspective view of a vehicle body in which a wire harness such as a wire bundle or a round bar conductor is routed on a rocker.

As shown in FIG. 6, in the structure in which the circuit body 1 formed of a wire bundle, a round bar conductor, and the like is routed on the upper surface 22 of the rocker 13, the height of the upper plate portion 52 of the interior member 50 assembled to the rocker 13 is increased, and boarding/alighting performance of the door opening 14 is impaired.

As shown in FIG. 7, in the circuit body 1 formed of a wire bundle, a round bar conductor, and the like, a portion of the center pillar 15 that is detoured through the side surface 15a on the vehicle interior side projects toward the vehicle interior side. Moreover, it is necessary to attach the protector 2 to the projecting portion so as to protect the same.

In contrast, according to the circuit body routing structure and the vehicle circuit body according to the first embodiment, the circuit body 30 is a flat conductor, and the linear portion 41 is disposed overlapping the upper surface 22 of the rocker 13. As a result, it is possible to suppress upward bulkiness of the rocker 13 and to reduce the height even in a state in which the rocker 13 is covered with the interior material 50, and it is possible to ensure excellent boarding/alighting performance (See FIG. 5). Further, at the junction 19 between the rocker 13 and the center pillar 15, the detour portion 42 is disposed overlapping the side surface 21 on the vehicle interior side of the rocker 13. Therefore, it is possible to reduce projection of the circuit body 30 toward the vehicle interior side and suppress occupation of the vehicle interior space. Moreover, a protector and a fastening structure for fastening the protector can be eliminated, and the weight and the cost can be reduced.

In particular, the detour portion 42 includes: the first planar bent portion 45 that is continuous with the linear portion 41 and that is bent toward the vehicle interior direction from the extending direction of the rocker 13 in a plane within the upper surface of the rocker 13; the folded portion 46 that is continuous with the first planar bent portion 45 and that is folded from the upper surface 22 of the rocker 13 to the extending direction of the center pillar 15 along the side surface 21 of the rocker 13; the second planar bent portion 47 that is continuous with the folded portion 46 and that is bent from the extending direction of the center pillar 15 to the extending direction of the rocker 13 in a plane within the side surface 21 of the rocker 22; and the coupling portion 48 that is continuous with the second planar bent portion 47 and that extends in the extending direction of the rocker 13. As a result, routing can be performed while minimizing protrusion toward the vehicle interior side and detouring around the center pillar 15 without difficulty.

(Second Embodiment)

Next, a circuit body routing structure and a vehicle circuit body according to a second embodiment will be described.

The same components as those in the first embodiment are denoted by the same reference numerals, and description thereof is omitted.

Figure 8:
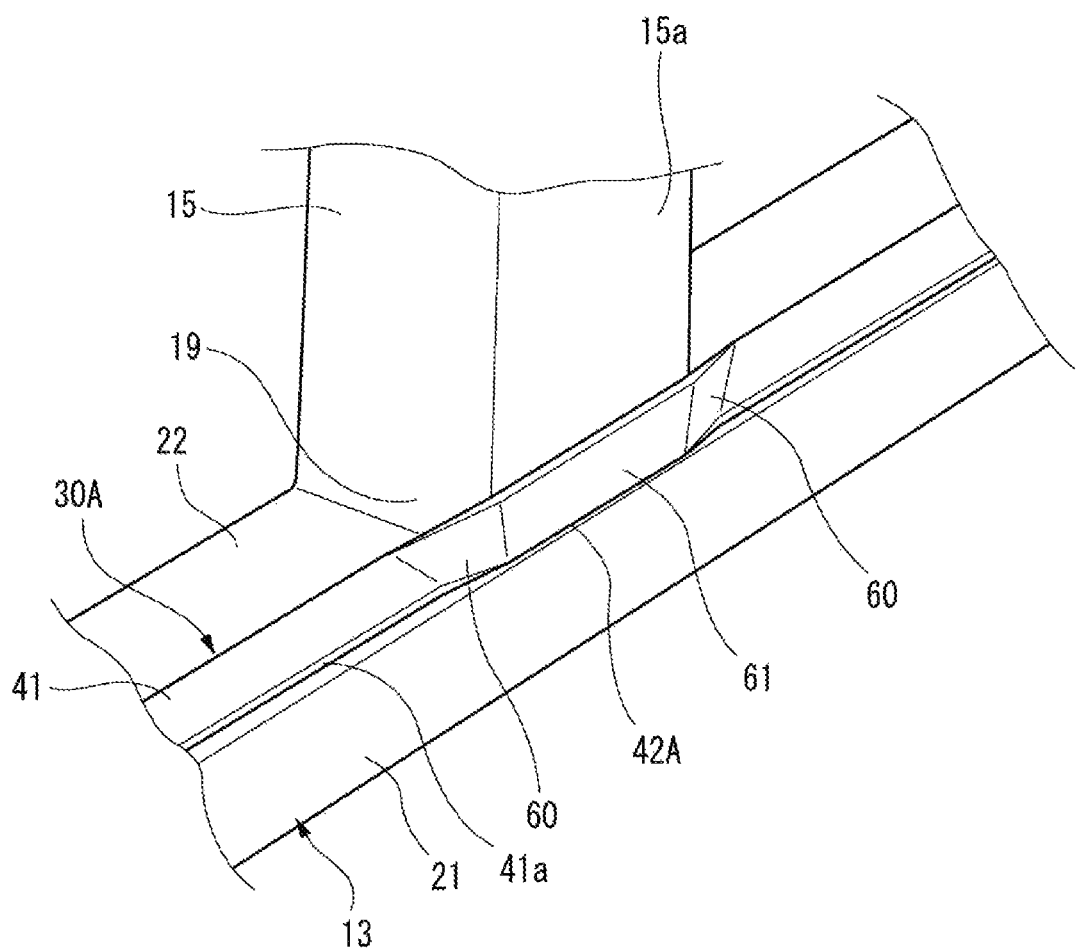
FIG. 8 is a perspective view of a rocker illustrating a circuit body routing structure and a vehicle circuit body according to a second embodiment.
Figure 9:
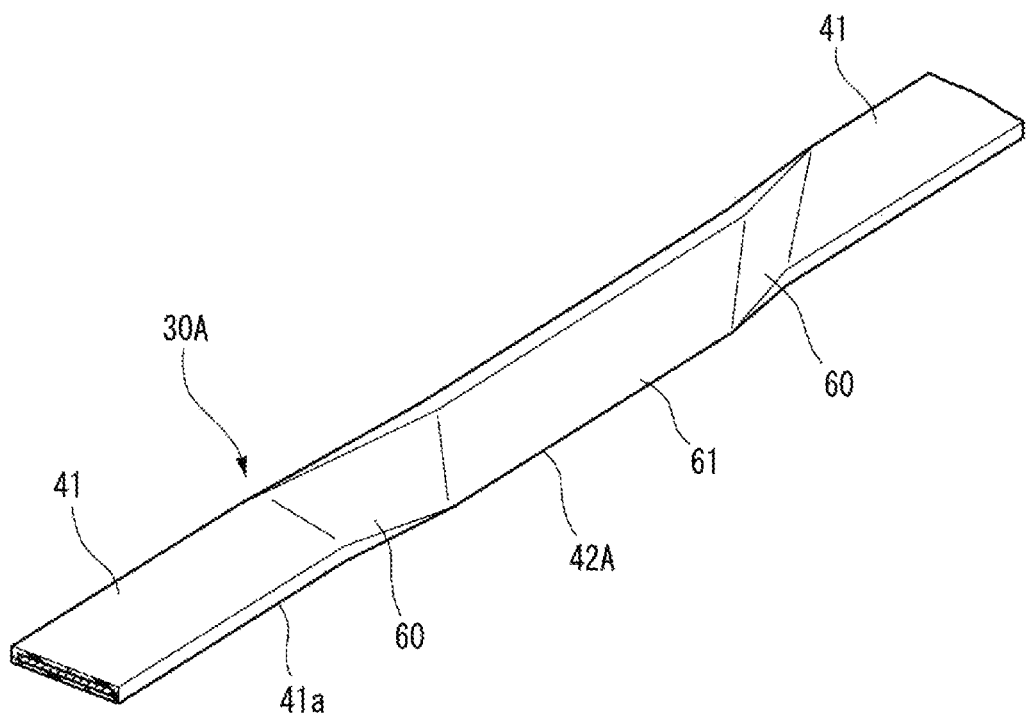
FIG. 9 is a perspective view of a detour portion of the vehicle circuit body.

FIG. 8 is a perspective view of a rocker for explaining the circuit body routing structure and the vehicle circuit body according to the second embodiment. FIG. 9 is a perspective view of a detour portion of the vehicle circuit body.

As shown in FIGS. 8 and 9, in the second embodiment, a circuit body 30A having a detour portion 42A including a direction changing portion 60 and a coupling portion 61 is routed on a rocker 13.

The direction changing portion 60 of the circuit body 30A is continuous with the linear portion 41 and is twisted in a direction from the linear portion 41 side along a side surface 15a of a center pillar 15 with reference to an edge portion 41 on a vehicle interior side. The coupling portion 61 is formed linearly, and both ends thereof are continuous with the direction changing portion 60. The coupling portion 61 is disposed overlapping the side surface 15a on the vehicle interior side of the center pillar 15.

The circuit body 30A is obtained by processing a flat conductor so as to twist with respect to one edge portion 41a of the linear portion 41 instead of simply twisting the flat conductor. In the circuit body 30A in which the detour portion 42A having the direction changing portion 60 and the coupling portion 61 is formed by twisting as described above, it is possible to easily detour around the center pillar 15 positioned in the extending direction of the linear portion 41.

The circuit body 30A having the linear portion 41 and the detour portion 42A is also obtained by extruding the long conductor portion 31, covering the same with the insulating layer 32, and then forming the detour portion 42 via pressing. The circuit body 30A may be covered with the insulating layer 32 after the detour portion 42 is formed via pressing on the long conductor portion 31.

According to the circuit body routing structure and the vehicle circuit body according to the second embodiment, the circuit body 30 is a flat conductor, and the linear portion 41 is disposed overlapping the upper surface 22 of the rocker 13. As a result, it is possible to suppress upward bulkiness of the rocker 13 and to reduce the height even in a state in which the rocker 13 is covered with the interior material 50, and it is possible to ensure excellent boarding/alighting performance (see FIG. 5). Further, at the junction 19 between the rocker 13 and the center pillar 15, the detour portion 42 is disposed overlapping the side surface 15a on the vehicle interior side of the center pillar 15. Therefore, it is possible to reduce projection of the circuit body 30 toward the vehicle interior side and suppress occupation of the vehicle interior space. Moreover, a protector and a fastening structure for fastening the protector can be eliminated, and the weight and the cost can be reduced.

In particular, the detour portion 42A is continuous with the linear portion 41, and includes: the direction changing portion 60 that is continuous with the linear portion 41 and that is twisted in a direction from the linear portion 41 side along the side surface 15a of the center pillar 15 with reference to the edge portion on the vehicle interior side; and the coupling portion 61 that is continuous with the direction changing portion 60 and that is routed in the extending direction of the rocker 13 overlapping the side surface 15a on the vehicle interior side of the center pillar 15. As a result, routing can be performed while minimizing protrusion toward the vehicle interior side and detouring around the center pillar 15 without difficulty.

The present invention is not limited to the above-described embodiments, and various modifications and improvements can be made. In addition, the material, shape, size, number, arrangement position, and the like of each component in the above-described embodiment are arbitrary without being limited as long as the present invention can be achieved.

Figure 10:
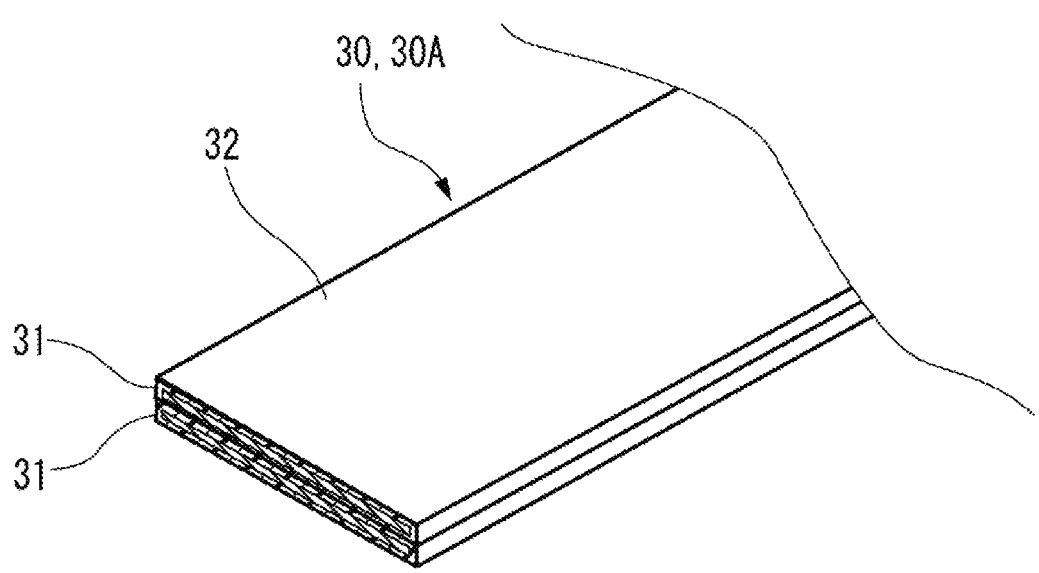
FIG. 10 is a perspective view of a vehicle circuit body including a flat conductor in which two conductor portions are laminated.

For example, in the above embodiment, the case where the conductor portion 31 has one circuit body 30, 30A routed on the rocker 13 is exemplified, but as shown in FIG. 10, the circuit body 30, 30A may be formed by laminating a plurality of conductor portions 31 covered with the insulating layer 32. For example, when two conductor portions 31 are laminated as the circuit body 30, 30A, one conductor portion 31 may be used as a power line, and the other conductor portion 31 can be used as a ground line (GND line).

Here, the features of the circuit body routing structure and the vehicle circuit body according to the present invention described above are briefly summarized in [1] to [4], respectively.

[1] A circuit body routing structure comprising a circuit body (30, 30A) routed, with respect to a vehicle body (11) having a rocker (13) on which a pillar (center pillar 15) is erected, along the rocker (13), wherein:
the circuit body (30, 30A) is formed of a long flat conductor having a conductor portion (31) of a flat cross-sectional shape, and includes:
a linear portion (41) disposed overlapping an upper surface (22) of the rocker (13), and
a detour portion (42, 42A) disposed overlapping a surface (21, 15a) on a vehicle interior side of the rocker (13) or the pillar (center pillar 15) at a junction (19) between the rocker (13) and the pillar (15).

[2] The circuit body routing structure according to [1], wherein:
the detour portion (42) includes:
a first planar bent portion (45) that is continuous with the linear portion (41) and that is bent toward a vehicle interior direction from an extending direction of the rocker (13) in a plane within the upper surface (22) of the rocker (13),
a folded portion (46) that is continuous with the first planar bent portion (45) and that is folded from the upper surface (22) of the rocker (13) to an extending direction of the pillar (center pillar 15) along a side surface (21) of the rocker (13),
a second planar bent portion (47) that is continuous with the folded portion (46) and that is bent from the extending direction of the pillar (center pillar 15) to the extending direction of the rocker (13) in a plane within the side surface (21) of the rocker (13), and
a coupling portion (48) that is continuous with the second planar bent portion (47) and that extends in the extending direction of the rocker (13).

[3] The circuit body routing structure according to [1], wherein:
the detour portion (42A) includes:
a direction changing portion (60) that is continuous with the linear portion (41) and that is twisted in a direction from the linear portion (41) side along the side surface (15a) of the pillar (center pillar 15) with reference to an edge portion (41a) on the vehicle interior side, and
a coupling portion (61) that is continuous with the direction changing portion (60) and that is routed in the extending direction of the rocker (13) overlapping the side surface (15a) on the vehicle interior side of the pillar (center pillar 15).

[4] A vehicle circuit body (30, 30A) routed, with respect to a vehicle body (11) having a rocker (13) on which a pillar (center pillar 15) is erected, along the rocker (13), wherein:
the circuit body (30, 30A) is formed of a long flat conductor having a conductor portion (31) of a flat cross-sectional shape, and includes:
a linear portion (41) disposed overlapping an upper surface (22) of the rocker (13), and
a detour portion (42, 42A) disposed overlapping a surface (side surface 21, side surface 15a) on a vehicle interior side of the rocker (13) or the pillar (center pillar 15) at a junction (19) of the rocker (13) and the pillar (center pillar 15).

What is claimed is:
1. A circuit body routing structure comprising:
a circuit body routed, with respect to a vehicle body having a rocker on which a pillar is erected, along the rocker,
wherein the circuit body is formed of a long flat conductor having a conductor portion of a flat cross-sectional shape, and includes:
a linear portion disposed overlapping an upper surface of the rocker, and
a detour portion disposed overlapping a surface on a vehicle interior side of the rocker or the pillar at a junction between the rocker and the pillar.
2. The circuit body routing structure according to claim 1, wherein
the detour portion includes:
a first planar bent portion that is continuous with the linear portion and that is bent toward a vehicle interior direction from an extending direction of the rocker in a plane within the upper surface of the rocker,
a folded portion that is continuous with the first planar bent portion and that is folded from the upper surface of the rocker to an extending direction of the pillar along a side surface of the rocker,
a second planar bent portion that is continuous with the folded portion and that is bent from the extending direction of the pillar to the extending direction of the rocker in a plane within the side surface of the rocker, and a coupling portion that is continuous with the second planar bent portion and that extends in the extending direction of the rocker.

3. The circuit body routing structure according to claim 1, wherein
   the detour portion includes:
      a direction changing portion that is continuous with the linear portion and that is twisted in a direction from the linear portion side along the side surface of the pillar with reference to an edge portion on the vehicle interior side, and
      a coupling portion that is continuous with the direction changing portion and that is routed in an extending direction of the rocker overlapping a side surface on the vehicle interior side of the pillar.

4. A vehicle circuit body routed, with respect to a vehicle body having a rocker on which a pillar is erected, along the rocker, wherein
   the vehicle circuit body is formed of a long flat conductor having a conductor portion of a flat cross-sectional shape, and includes:
      a linear portion disposed overlapping an upper surface of the rocker, and
      a detour portion disposed overlapping a surface on a vehicle interior side of the rocker or the pillar at a junction between the rocker and the pillar.

* * * * *